(No Model.)
E. GRAH.
ELECTRIC VALVE CONTROLLER.
No. 386,463. Patented July 24, 1888.
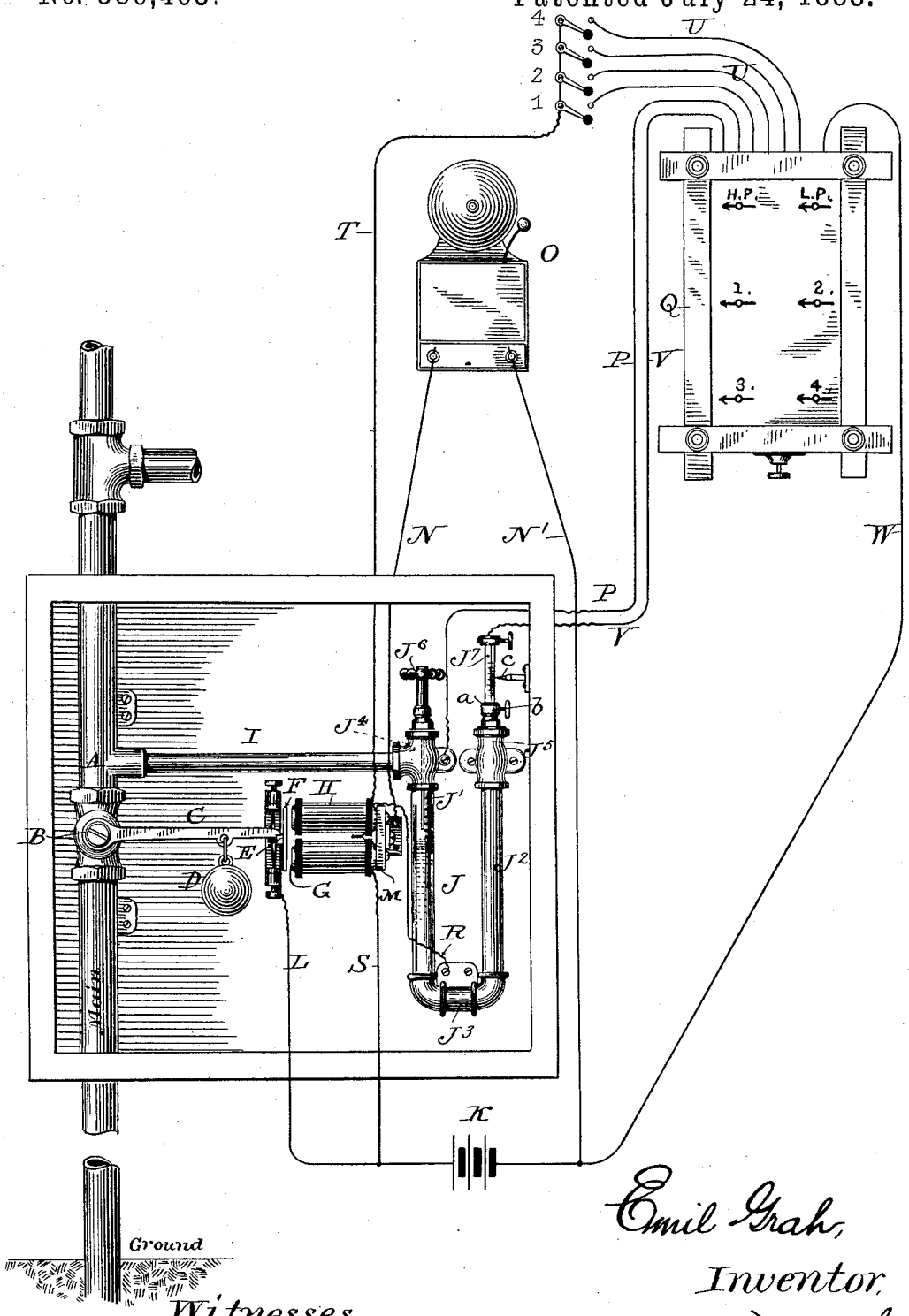
Witnesses
H. C. Newman,
Ed. A. Newman,
Emil Grah,
Inventor,
By his Attorneys Dodge & Son,

UNITED STATES PATENT OFFICE.

EMIL GRAH, OF TOLEDO, OHIO, ASSIGNOR OF ONE-HALF TO WILLIAM GRAH, JR., OF SAME PLACE.

ELECTRIC VALVE-CONTROLLER.

SPECIFICATION forming part of Letters Patent No. 386,463, dated July 24, 1888.

Application filed January 25, 1888. Serial No. 261,869. (No model.)

*To all whom it may concern:*

Be it known that I, EMIL GRAH, of Toledo, in the county of Lucas and State of Ohio, have invented certain new and useful Improvements in Electric Valve-Controllers, of which the following is a specification.

My invention relates to the control, more particularly, of natural gas, though equally applicable to the control of other gases and fluids; and it comprises, first, an automatic pressure-regulator, whereby, when the pressure exceeds or falls below a predetermined limit, the supply will be shut off and an alarm sounded.

The invention further consists in the employment of a series of switches in different parts of the building, and so arranged that in case of fire the supply may be shut off and an alarm sounded.

The invention also consists in the employment of an annunciator, in combination with the foregoing devices, whereby the cause or reason for shutting off the supply of gas, or the point from which it was shut off, may be ascertained or indicated.

The drawing represents the preferred form of my apparatus.

A indicates the main or pipe adapted to supply the house, and B a valve placed in said pipe and adapted when turned to cut off the supply of gas from the house.

The stem of the valve is extended outward, and is provided with an arm or lever, C, which in turn is provided with a weight, D, as shown, the arm of the valve being supported by or upon an insulated lug or block, E, which is carried by or formed upon a pivoted armature, F, which latter is arranged directly opposite the cores G of an electro-magnet, H.

From this construction it follows that when the electro-magnet is energized by means of devices and under certain conditions, hereinafter referred to, the armature F will be attracted and the insulated lug or block E will be withdrawn from beneath the end of the arm C, thereby allowing the weight to pull the arm downward, turning the valve, and shutting off the supply.

Immediately above the valve B is a branch pipe, I, which connects with one end of the pressure-gage J, as clearly shown. This pressure-gage comprises two upright tubes, J' and $J^2$, connected by a metallic section, $J^3$, each of the tubes being provided at their upper ends with metallic caps $J^4$ and $J^5$. Passing downward through the cap J' is a stem or spindle, $J^6$, which extends downward into the tube J, where it is provided, advisably, with a platinum point, the adjustment of the stem $J^6$ being made with reference to a scale upon the tube J. Passing down through an insulated block, $a$, secured to the cap $J^5$, is a stem, $J^7$, which is likewise provided at its lower end with a platinum point, the said stem being held in any desired adjustment by means of a set-screw, $b$.

Instead of graduating the tube $J^2$, which in some cases may be made of metal, I graduate the stem $J^7$, and employ a pointer or indicator $c$, by which the regulation or adjustment of the stem may be determined.

The usual quantity of mercury will be placed within the pressure-gage, and it will be seen that when the pressure in the main exceeds a predetermined limit it will depress the column of mercury in the tube J' and correspondingly raise that in the tube $J^2$, thereby bringing the mercury into contact with the platinum point on the end of the stem $J^7$. Should, however, the pressure fall below the predetermined limit, the mercury in the tube J' will rise and come into contact with the platinum point on the end of the stem $J^6$.

By an arrangement of circuits, which I will now explain, this movement of the mercury-column is caused to actuate an alarm and annunciator in case the pressure exceeds or falls below the predetermined limit or is entirely shut off.

K indicates a battery, from which extends a wire, L, which latter is in turn electrically connected with the movable armature F.

The cores G of the magnet are electrically connected at their rear ends with a plate, M, and from said plate extends a wire or conductor, N, which extends to a bell, O, and from said bell the circuit is completed by means of a wire or conductor, N', which connects with the battery.

Connected with the metallic cap $J^4$ of the pressure-gage is a wire or conductor, P, which extends to an annunciator, Q.

R indicates a wire or conductor, extending from the metallic portion $J^3$ of the pressure-gage to the electro-magnet H, and S indicates a wire extending from the electro-magnet to the battery K. The wire T is connected at one end with the electro-magnet H, and extends to the different rooms of the house, the said wire T being provided with a number of switches, 1 2 3 4, from each of which a wire, U, extends to the annunciator, as shown.

V indicates a wire or conductor, extending from the upper end of the stem $J^7$ of the pressure-gage to the annunciator, and W indicates the return wire extending from the annunciator to the battery K.

Assuming the parts to be in the position represented in the drawings and the pressure in the main normal, none of the circuits hereinbefore referred to will be completed, and hence no alarm will be sounded, nor will the valve be permitted to close or shut off the supply. The moment the pressure exceeds a predetermined limit the gas or fluid flowing through the pipe I will depress the mercury of the tube $J'$ and raise that contained in the tube $J^2$. As the mercury thus rises in the tube $J^2$, it comes in contact with the platinum point or extension of the stem $J^7$ and electrically connects said stem $J^7$ and its wire or conductor V with the annunciator. When this occurs, the circuit is completed through the battery K, through line S, electro-magnet H, wire R, metallic section $J^3$ of the gage, the mercury within the gage, stem $J^7$, wire V, annunciator Q, and wire W. The result of completing this circuit is to energize the magnets H and attract the armature F, so as to withdraw the lug E from beneath the arm or lever C, thereby allowing the latter to fall, as indicated in dotted lines, and shut off the supply of gas from the house. The completion of the circuit also operates the shutter or indicator, which is marked "H P" on the annunciator, showing that the supply was cut off, owing to the abnormal pressure. As the armature F is attracted and brought into contact with the cores G of the magnets H, another circuit is completed through battery K, wire L, armature F, cores G, plate M, wire N, bell O, and wire N', and it will follow that so long as the armature remains in engagement with the cores of the magnet just so long will the bell O ring.

If the pressure in the main should fall below the predetermined limit, the mercury in the tube $J^2$ would fall and a corresponding rise would occur in the tube $J'$, and as soon as the mercury comes into contact with the stem $J^6$ a circuit will be completed by means of the metallic cap-plate $J^4$, wire P, annunciator Q, wire W, battery K, wire S, electro-magnet H, wire R, and metallic section $J^3$ of the gage.

The indicator (marked "L P" in the annunciator) will be operated by the completion of this circuit, thereby indicating the reason for cutting off the supply, and the bell O will also be rung when the supply is cut off, the circuit being completed through the line S and the armature and cores of the magnet and the bell, as before. Should, however, it be desirable to operate the valve B from any room in a house on account of fire, it will only be necessary to connect the wire T with any one of the wires U by means of switches 1 2 3 4, which are located at different points in the house, thereby cutting off the supply from the entire house. When the wires T and U are connected by the switches, a circuit, comprising wire T, switch 1, wire U, annunciator Q, wire W, battery K, wire S, and electro-magnet H, is completed, and the lug on the armature withdrawn from beneath the arm C, as before. As soon as the armature is attracted, the bell circuit is completed and an alarm sounded.

The wires P and V are connected, respectively, with the shutters or indicators marked "L P" and "H P," while the wires U, extending from the switches 1 2 3 4, &c., are connected with the shutters or indicators marked 1 2 3 4, &c., on the annunciator. It will of course be understood that wires or conductors extend from these wires or indicators to a metallic strip, bar, or binding-post within the annunciator, and it is with this bar, strip, or post that the wire W connects.

From this construction it follows that the circuit will be completed through the annunciator whenever the electro-magnet is energized to operate the valves, and this, too, whether the energization be caused by variations in the pressure or by means of the switches.

It will also be noted that the annunciator will designate or indicate absolutely and without any possibility of mistake the reason for the supply being shut off, and when the switches are used the particular room from which the electro-magnet was energized.

From this construction it will be seen that the alarm will be sounded when the pressure exceeds or falls below the predetermined limit, and will also be caused to ring when the gas is shut off by means of the switches. The bell will ring continuously until the armature is removed away from the magnet.

I am aware that prior to my invention it has been proposed to operate a valve electrically when the pressure in the main exceeds a predetermined limit, and to such an arrangement I make no broad claim; and I am also aware that it has been proposed to govern the operation of a pressure actuated valve by means of a supplementary valve, which latter is in turn operated electrically through a pressure-gage, and such an arrangement I disclaim. I am not aware, however, that any one has ever before provided for the automatic shutting off of the supply in case the pressure in the main or pipe exceeds or falls below a predetermined limit; nor am I aware that it has been proposed to combine with such an arrangement an annunciator which shall indicate positively the reason for the supply being cut off.

Having thus described my invention, what I claim is—

1. In combination with a main or pipe, a valve located therein, an electro-magnet, an armature adapted to hold said valve open, a battery, a pressure-gage, and electric connections, arranged substantially as described, whereby, when the pressure exceeds or falls below a predetermined limit, the electro-magnet will be energized, its armature rocked, and the valve turned and the supply thereby cut off.

2. In combination with a main or pipe, a valve located therein, an armature adapted to hold said valve open, an electro-magnet controlling said armature, a pressure-gage communicating with the main or pipe and subject to the pressures therein, and an electric circuit, arranged substantially as shown, and including the magnet and pressure-gage.

3. In combination with a main or pipe, a valve located therein, an electric circuit, comprising a battery, an electro-magnet, and a pressure-gage, an armature for said magnet adapted to hold said valve normally open, an electric bell, and a second circuit, in which said bell is included, all arranged for operation substantially in the manner shown.

4. In combination with main or pipe A, having valve B, electro-magnet H, having an armature, F, to hold the valve open, a mercurial pressure-gage, J, provided with a metallic section, $J^3$, and with contact-points $J^6$ and $J^7$, a battery, K, wire S, extending from the battery to the magnet, wire R, connecting the metallic section $J^3$ of the gage with the magnet, and wires P and V, extending, respectively, from the points $J^6$ and $J^7$ to the battery.

5. In combination with a main or supply pipe, a valve located therein, an electro-magnet and armature adapted to control the valve, an annunciator, a pressure-gage, and an electric circuit, including the annunciator, gage, and electro-magnet, all substantially as shown.

6. In combination with a main or supply pipe, a valve located therein, an electro-magnet and armature adapted to control the valve, an annunciator, a pressure-gage, a bell, and an electric circuit, including the bell, magnet, annunciator, and gage, all substantially as shown.

7. In combination with a main or supply pipe, a valve located therein, an electro-magnet and armature adapted to control the valve and included in an electric circuit, a switch, and an annunciator, also included in the circuit, as and for the purpose set forth.

8. In combination with a main or supply pipe, a valve located therein, an electro-magnet and armature adapted to control the valve and included in an electric circuit, and a switch, annunciator, and a bell, also included in the circuit, substantially as and for the purpose set forth.

9. In combination with main or pipe A, having a valve, B, electro-magnet H, having an armature, F, adapted to hold the valve open, pressure-gage J, communicating with the main and provided with contact-points $J^6$ and $J^7$, battery K, wires S and R, connecting the magnet with the battery and gage, respectively, wires P and V, electrically connected with opposite ends of the gage or the contact-points $J^6$ and $J^7$, and in connection, also, with the battery, a wire, L, extending from the battery to the armature F, a bell, O, wire N, extending from the core of the magnet to the bell, and a wire, N', extending from the bell back to the battery.

10. In an apparatus for regulating or controlling the supply of natural gas or other fluids, the combination of the following elements, to wit: a supply-pipe, a valve located therein, an electro-magnet provided with an armature and adapted to hold the valve normally open, a pressure-gage communicating with the supply-pipe and included in the main circuit, an annunciator and a switch, one or more, also included in the circuit, a second circuit, and a bell included in said circuit.

11. In combination with a main or supply pipe, a valve located therein, a pressure-gage subject to the pressures within the main, conductors extending from opposite ends of the gage and forming a normally-open electric circuit, an electro-magnet having an armature to hold the valve open and included in the circuit, all substantially as shown, whereby, when the pressure exceeds or falls below a predetermined limit, the circuit will be completed and the valve caused to shut off the supply.

12. In combination with a main or supply pipe, a valve, B, located therein, and adapted to cut off the supply, an electro-magnet, H, included in a normally-open circuit, an armature adapted to hold the valve normally open, and a second circuit, including a bell and the armature of the electro-magnet.

In witness whereof I hereunto set my hand in the presence of two witnesses.

EMIL GRAH.

Witnesses:
E. E. RICHARDS,
J. T. NEWTON.